US009800497B2

(12) United States Patent
Kapadia et al.

(10) Patent No.: US 9,800,497 B2
(45) Date of Patent: Oct. 24, 2017

(54) OPERATIONS, ADMINISTRATION AND MANAGEMENT (OAM) IN OVERLAY DATA CENTER ENVIRONMENTS

(71) Applicant: Cisco Technology, Inc., San Jose, CA (US)

(72) Inventors: Shyam Kapadia, San Jose, CA (US); Liqin Dong, San Jose, CA (US); Yibin Yang, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 100 days.

(21) Appl. No.: 14/723,291

(22) Filed: May 27, 2015

(65) Prior Publication Data

US 2016/0352633 A1 Dec. 1, 2016

(51) Int. Cl.
*H04L 12/715* (2013.01)
*H04L 12/721* (2013.01)
(Continued)

(52) U.S. Cl.
CPC .............. *H04L 45/64* (2013.01); *H04L 12/46* (2013.01); *H04L 12/4625* (2013.01);
(Continued)

(58) Field of Classification Search
CPC ..... H04L 12/4633; H04L 45/64; H04L 45/74; H04L 69/22; H04L 49/70; H04L 45/745;
(Continued)

(56) References Cited

U.S. PATENT DOCUMENTS

2013/0332602 A1* 12/2013 Nakil .................. G06N 99/005 709/224
2014/0112349 A1 4/2014 Moreno et al.
(Continued)

OTHER PUBLICATIONS

Nordmark, E., Appanna, C., Lo, A., Arista Networks; “Layer-Transcending Traceroute for Overlay Networks like VXLAN draft-nordmark-nvo3-transcending-traceroute-00”; Internet Engineering Task Force, IETF; Standard Working Draft, Internet Society (ISOC) 4, Rue Des Falaises CH-1205 Geneva, Switzerland.
(Continued)

*Primary Examiner* — Awet Haile
(74) *Attorney, Agent, or Firm* — Polsinelli PC

(57) ABSTRACT

Systems, methods, and computer-readable media for OAM in overlay networks. In response to receiving a packet associated with an OAM operation from a device in an overlay network, the system generates an OAM packet. The system can be coupled with the overlay network and can include a tunnel endpoint interface associated with an underlay address and a virtual interface associated with an overlay address. The overlay address can be an anycast address assigned to the system and another device in the overlay network. Next, the system determines that a destination address associated with the packet is not reachable through the virtual interface, the destination address corresponding to a destination node in the overlay network. The system also determines that the destination address is reachable through the tunnel endpoint interface. The system then provides the underlay address associated with the tunnel endpoint interface as a source address in the OAM packet.

17 Claims, 8 Drawing Sheets

(51) Int. Cl.
*H04L 12/24* (2006.01)
*H04L 12/46* (2006.01)
*H04L 12/741* (2013.01)

(52) U.S. Cl.
CPC .......... *H04L 12/4633* (2013.01); *H04L 41/04* (2013.01); *H04L 45/66* (2013.01); *H04L 45/74* (2013.01)

(58) Field of Classification Search
CPC ..... H04L 49/25; H04L 12/46; H04L 2212/00; H04L 47/825; H04L 45/124; H04L 12/4604; H04L 43/00; H04L 45/021; H04L 49/10
See application file for complete search history.

(56) References Cited

U.S. PATENT DOCUMENTS

2014/0241144 A1* 8/2014 Kashyap ............... H04L 47/365 370/216
2014/0376550 A1 12/2014 Khan et al.
2015/0195178 A1* 7/2015 Bhattacharya ........ H04L 45/745 718/1

OTHER PUBLICATIONS

International Search Report and Written Opinion mailed Jul. 29, 2016 for corresponding PCT Application No. PCT/US2016/035349.

* cited by examiner

OPERATIONS, ADMINISTRATION AND MANAGEMENT (OAM) IN OVERLAY DATA CENTER ENVIRONMENTS

TECHNICAL FIELD

The present technology pertains to implementing the operations, administration, and management (OAM) protocol in an overlay environment, and more specifically to utilizing underlay addresses to facilitate overlay OAM in overlay networks.

BACKGROUND

Operations, administration, and management (OAM) is a toolset available for MPLS (multiprotocol label switching), IP (Internet protocol), and Ethernet networks. Some example OAM tools and protocols include ICMP (Internet control message protocol), LSP (label switched path) ping and traceroute, BFD (bidirectional forwarding detection), VCCV (virtual circuit connection verification), IPPM (IP performance metrics), MPLS OAM, and Ethernet OAM. These OAM tools and protocols can be extremely powerful, as they provide various fault detection, fault verification, and performance monitoring capabilities in MPLS, IP, and Ethernet networks, at various layers of the networking stack.

Overlay networks are extremely extensible and increasingly popular networks based on a new layer 2 overlay scheme over a layer 3 network. Overlay networks, such as virtual extensible LAN (VXLAN), support a flexible, large-scale multitenant environment over a shared common physical infrastructure. Unfortunately, however, some OAM tools, such as ICMP traceroute, currently do not work properly in overlay networks. Consequently, the advantages and benefits of OAM tools are significantly limited in current overlay networks.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
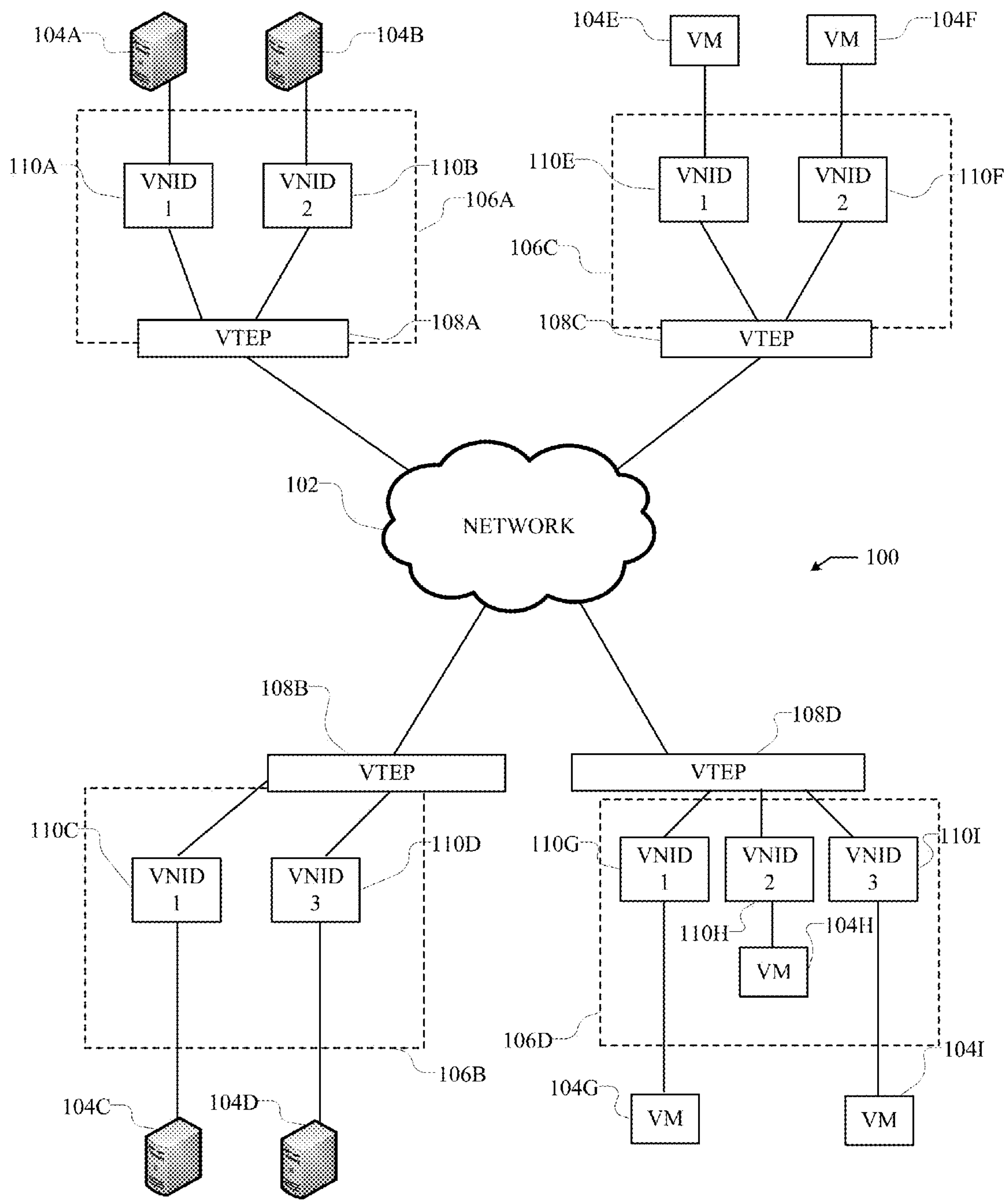
FIG. 1 illustrates a diagram of an example overlay network.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein can be used to implement OAM tools and operations in an overlay network. Communications between the overlay and the underlay in a network typically flow from a virtual interface on a device, such as a switching virtual interface (SVI), to a tunnel endpoint interface, such as a VXLAN tunnel endpoint (VXLAN) interface, on either the same or a different device. Virtual interfaces in an overlay network often have an assigned anycast address shared between multiple devices. Accordingly, since multiple virtual interfaces in the overlay may share the same address, it can be difficult or impossible to distinguish which specific virtual interface and device is associated with an OAM packet handled by a virtual interface in the overlay. For example, the OAM packet may identify the specific virtual interface which handled the OAM packet by including the associated anycast address of the specific virtual interface, but does not distinguish the specific virtual interface from the virtual interfaces sharing that particular anycast address. As a result, OAM tools and operations can be greatly limited in overlay networks.

The approaches herein can be implemented to modify OAM packets in an overlay context to identify the underlay address of a relevant device in lieu of the anycast address assigned to the virtual interface of the relevant device. Since the underlay address is typically a unique address in the underlay, the OAM packet can clearly identify which specific device is associated with the OAM packet, even if the specific device has a virtual interface which uses an anycast address that is shared by the virtual interface and other virtual interfaces or devices in the overlay. Accordingly, these approaches allow OAM tools and operations to be implemented in an overlay context without the current limitations.

Disclosed are systems, methods, and computer-readable storage media for operations, administration and management (OAM) operations in an overlay network. A system coupled with an overlay network can generate an OAM packet in response to receiving a packet associated with an OAM operation from a device in the overlay network. The system can include a tunnel endpoint interface associated with an underlay address and a virtual interface associated with an overlay address. The overlay address can be an anycast address that is assigned to the system and one or more devices in the overlay network. For example, the anycast address can be an overlay address that is assigned to multiple switch virtual interfaces (SVIs) in the overlay network. Moreover, the tunnel endpoint can encapsulate and decapsulate packets for communications between the underlay network (i.e., the physical network) and the overlay network.

Next, the system can determine that a destination address associated with the packet is not reachable by the system through the virtual interface, and the destination address is reachable by the system through the tunnel endpoint interface. In other words, the system can determine that it is an ingress switch in the path between the device and a destination node in the overlay network associated with the destination address in the packet. Also, as previously indicated, the destination address associated with the packet can be the address of a destination node in the overlay network (i.e., the intended recipient or target of the packet).

Then, the system can provide the underlay address associated with the tunnel endpoint interface of the system as a source address in the OAM packet. For example, the system can modify the source address provided in the OAM packet when the OAM packet is originally created to identify the underlay address. Typically, in the context of an overlay network, when the OAM packet is created by a tunnel endpoint interface, the source address provided in the OAM packet is the overlay address of the virtual interface which sends the OAM packet back to the device which sent the packet that triggered the OAM operations. However, since the overlay address can be an anycast address shared by multiple devices, it may be difficult or impossible to distinguish which specific device is associated with the OAM packet when the source address in the OAM packet is the anycast address shared by the multiple devices. Thus, by modifying the OAM packet to provide the underlay address, which is typically a unique address in the underlay network, the OAM packet can clearly indicate which specific device is associated with the OAM packet even if such device has a virtual interface with an anycast address shared by other devices on the overlay network.

Description

A computer network can include a system of hardware, software, protocols, and transmission components that collectively allow separate devices to communicate, share data, and access resources, such as software applications. More specifically, a computer network is a geographically distributed collection of nodes interconnected by communication links and segments for transporting data between endpoints, such as personal computers and workstations. Many types of networks are available, ranging from local area networks (LANs) and wide area networks (WANs) to overlay and software-defined networks, such as virtual extensible local area networks (VXLANs), and virtual networks such as virtual LANs (VLANs) and virtual private networks (VPNs).

LANs typically connect nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and devices.

The Internet is an example of a public WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by intermediate network nodes, such as routers, switches, hubs, or access points (APs), which can effectively extend the size or footprint of the network.

Networks can be segmented into subnetworks to provide a hierarchical, multilevel routing structure. For example, a network can be segmented into subnetworks using subnet addressing to create network segments. This way, a network can allocate various groups of IP addresses to specific network segments and divide the network into multiple logical networks.

In addition, networks can be divided into logical segments called virtual networks, such as VLANs, which connect logical segments. For example, one or more LANs can be logically segmented to form a VLAN. A VLAN allows a group of machines to communicate as if they were in the same physical network, regardless of their actual physical location. Thus, machines located on different physical LANs can communicate as if they were located on the same physical LAN. Interconnections between networks and devices can also be created using routers and tunnels, such as VPN or secure shell (SSH) tunnels. Tunnels can encrypt point-to-point logical connections across an intermediate network, such as a public network like the Internet. This allows secure communications between the logical connections and across the intermediate network. By interconnecting networks, the number and geographic scope of machines interconnected, as well as the amount of data, resources, and services available to users can be increased.

Further, networks can be extended through network virtualization. Network virtualization allows hardware and software resources to be combined in a virtual network. For example, network virtualization can allow multiple numbers of VMs to be attached to the physical network via respective VLANs. The VMs can be grouped according to their respective VLAN, and can communicate with other VMs as well as other devices on the internal or external network.

To illustrate, overlay networks generally allow virtual networks to be created and layered over a physical network infrastructure. Overlay network protocols, such as Virtual Extensible LAN (VXLAN), Network Virtualization using Generic Routing Encapsulation (NVGRE), and Stateless Transport Tunneling (STT), provide a traffic encapsulation scheme which allows network traffic to be carried across L2 and L3 networks over a logical tunnel. Such logical tunnels can be originated and terminated through virtual tunnel end points (VTEPs). The VTEPs can tunnel the traffic between an underlay network and any overlay network, such as a VXLAN, an NVGRE, or a STT, for example.

Moreover, overlay networks can include virtual segments, such as VXLAN segments in a VXLAN overlay network, which can include virtual L2 and/or L3 overlay networks over which VMs communicate. The virtual segments can be identified through a virtual network identifier (VNI), such as a VXLAN network identifier, which can specifically identify an associated virtual segment or domain.

An Ethernet Virtual Private Network (EVPN) is a layer 2 virtual private network (L2VPN) solution over IP/MPLS networks. EVPN was originally designed for applications such as data center interconnect (DCI) and business L2VPN services. However, EVPN can also be used as a network virtualization overlay (NVO) solution. NVO is a virtualized solution that addresses the requirements of a multi-tenant data center. EVPN can be used as the control plane for NVO with support of various encapsulation options. An EVPN instance represents a VPN on a PE router and it can include CE devices that are connected to PE devices that form the edge of the MPLS infrastructure. The PE devices can provide virtual layer 2 bridged connectivity between the CE devices. A service provider network can include multiple EVPN instances. EVPN may provide advanced multi-homing capabilities, and may use Border Gateway Protocol (BGP) to distribute customer address information over the core network. In particular, BGP can be used as a control protocol to distribute tenant system (TS) reachability and underlay tunnel endpoint information.

As previously mentioned, operations, administration, and management (OAM) is a toolset available for MPLS, IP, and Ethernet networks. Some example OAM tools and protocols include ICMP, LSP ping and traceroute, BFD, VCCV, IPPM, MPLS OAM, and Ethernet OAM. These OAM tools and protocols can provide various fault detection, fault verification, and performance monitoring capabilities in MPLS, IP, and Ethernet networks, at various layers of the networking stack.

For example, ICMP is an OAM protocol for IP networks. ICMP messages are typically used for diagnostic or control purposes, or generated in response to errors in IP operations. To illustrate, upon receiving an IP packet, a router can decrement the time-to-live (TTL) field in the packet's header by one. If the resulting TTL is zero, the packet can be discarded and the ICMP TTL exceeded in transit error message sent to the packet's source address. ICMP messages can be carried within standard IP packets. Moreover, ICMP error messages can have data sections which contain IP headers of the original packet causing the error. ICMP messages are widely used in debugging and monitoring tools, such as traceroute.

Figure 2:
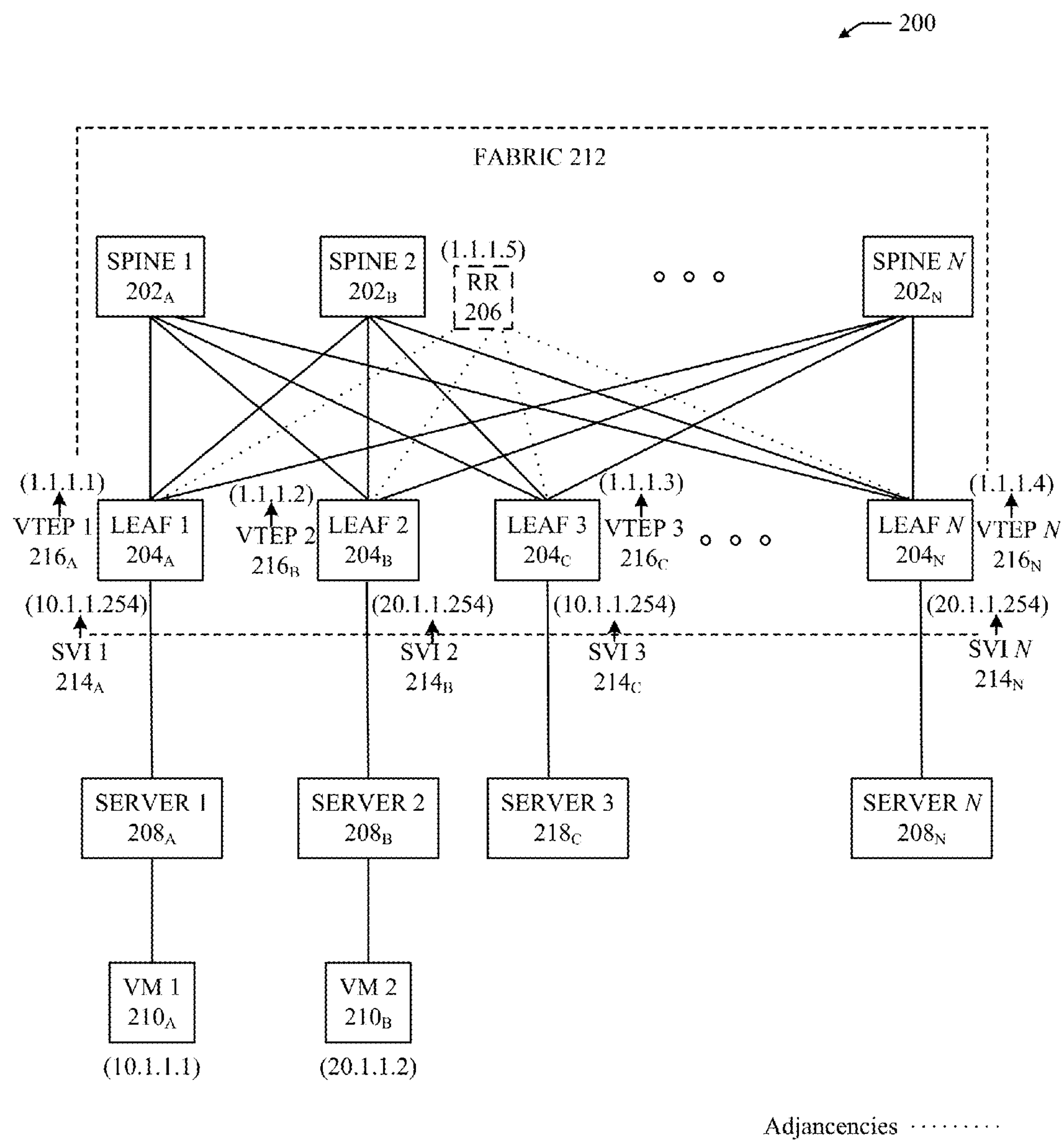
FIG. 2 illustrates an example deployment of overlay network.
Figure 3:
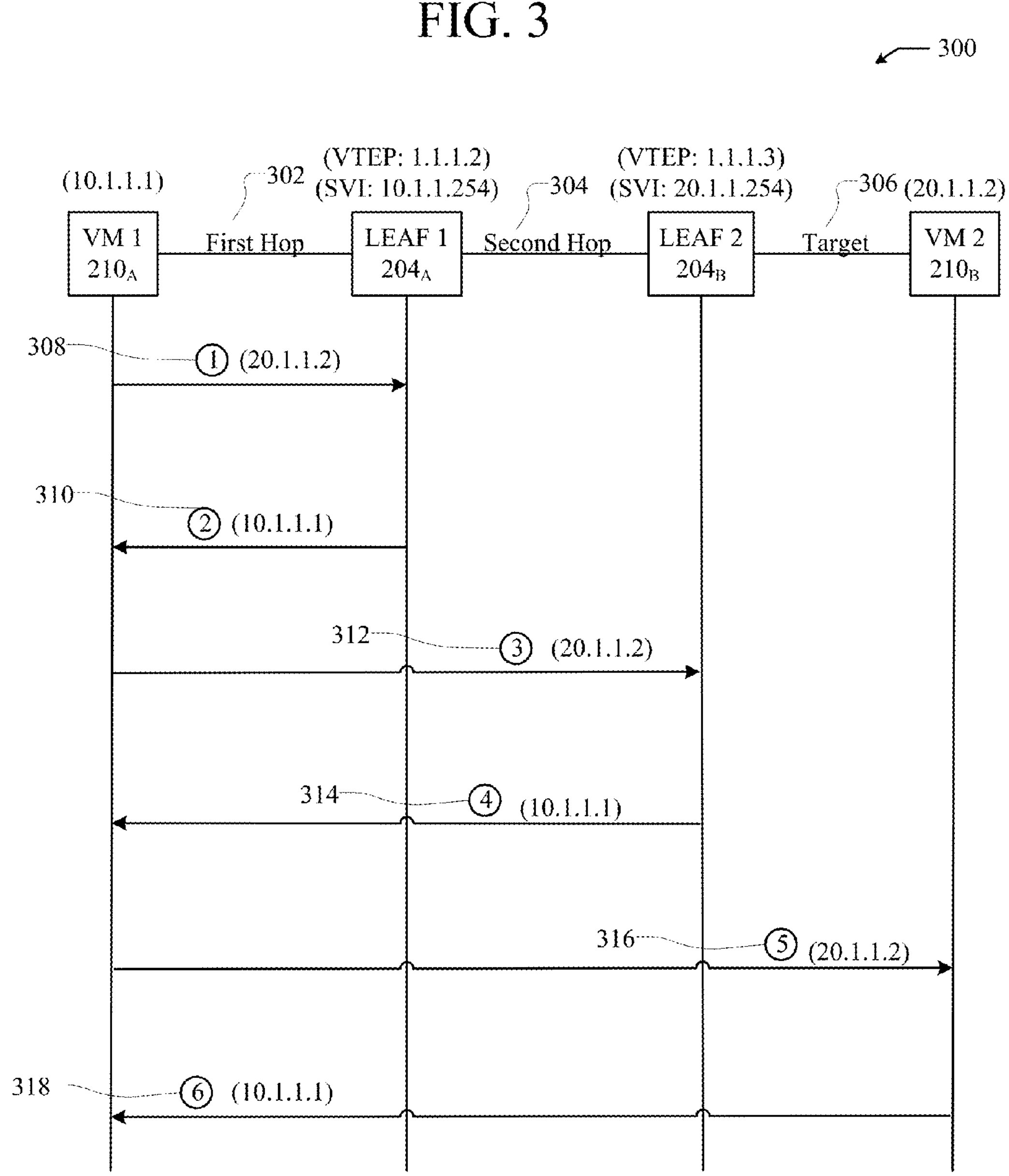
FIG. 3 illustrates a diagram of an example OAM message operation.
Figure 4:
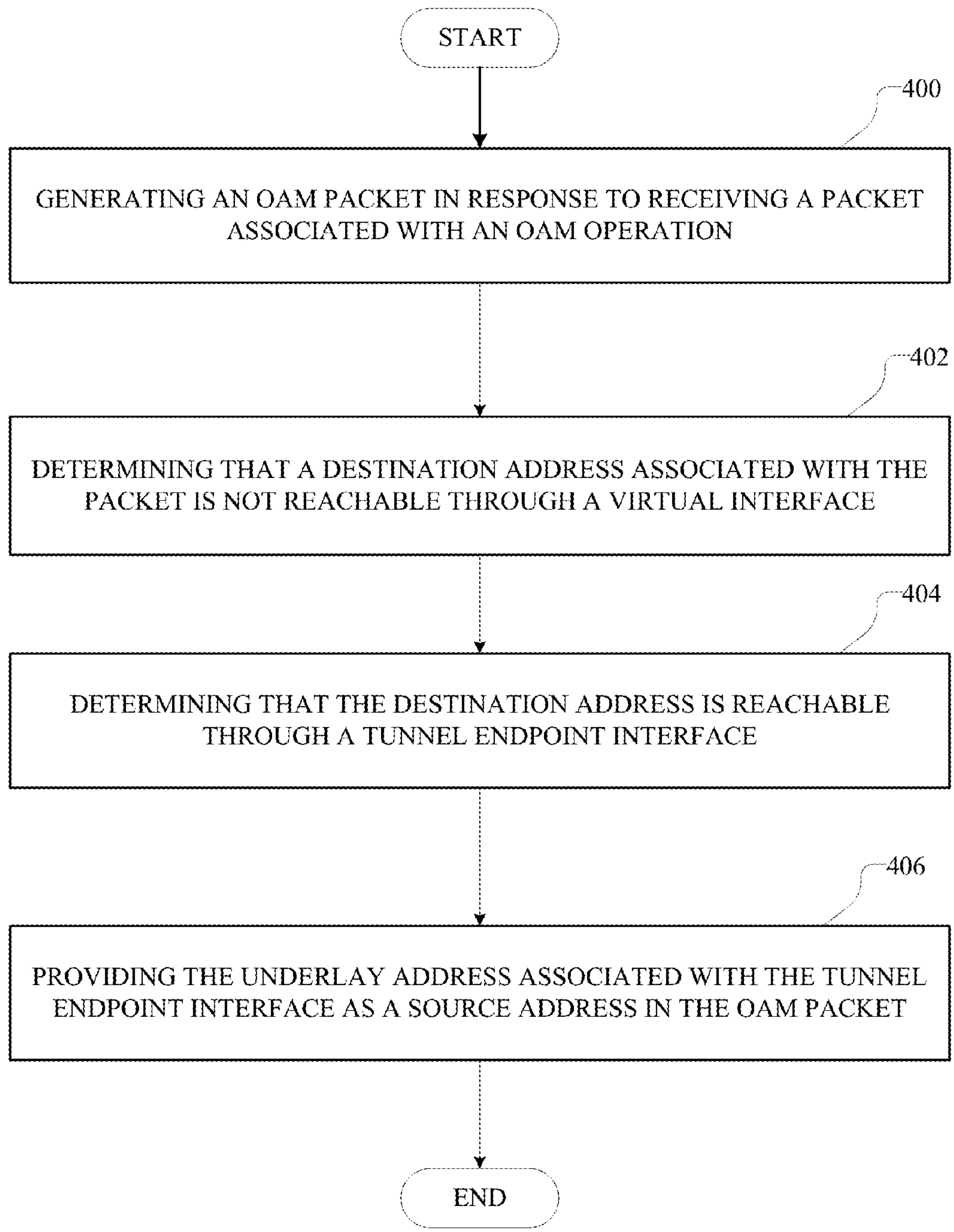
FIGS. 4 and 5 illustrate example method embodiments.
Figure 5:
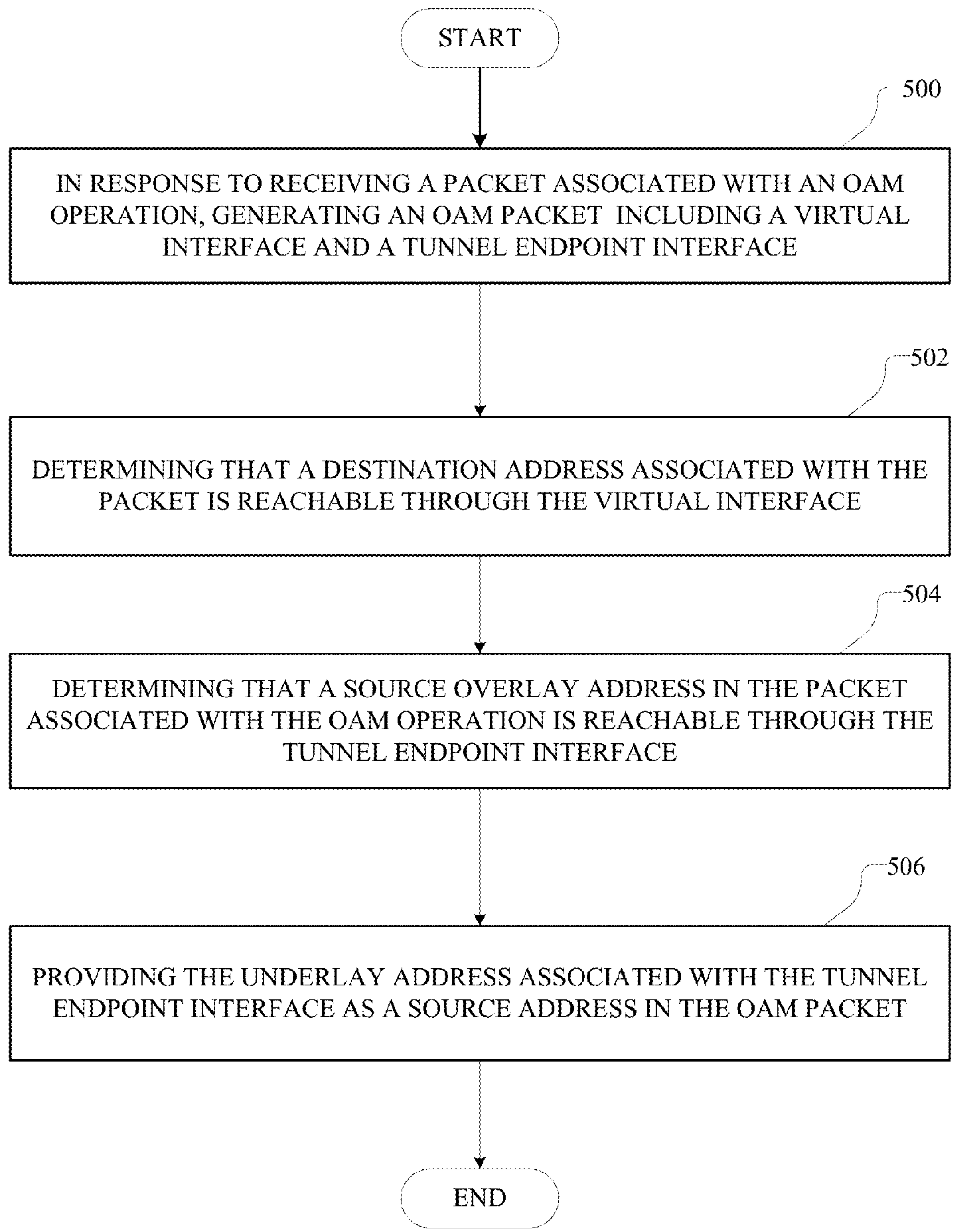
Figure 6:
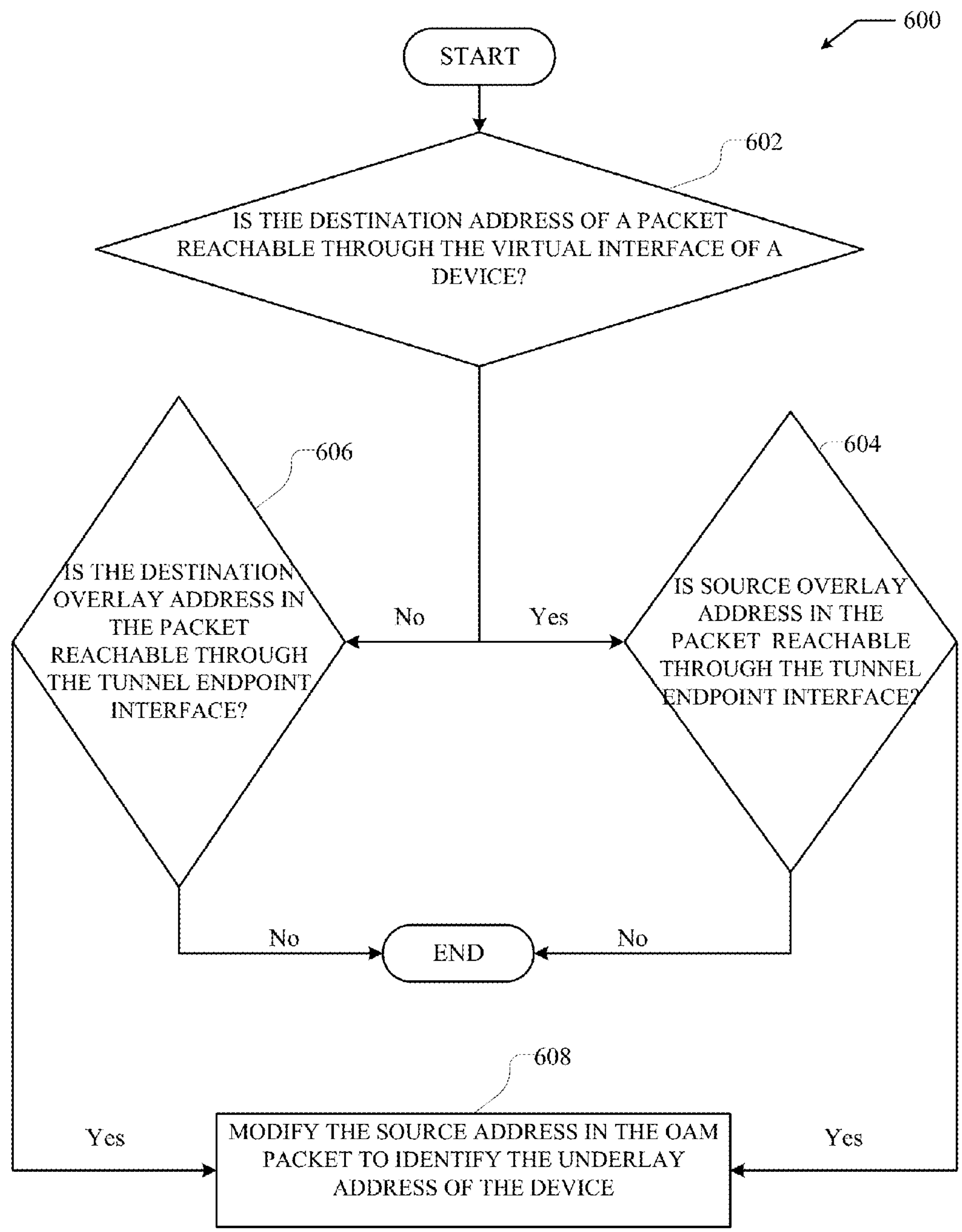
FIG. 6 illustrates a flowchart of an example process for determining whether to modify an OAM packet.
Figure 7:
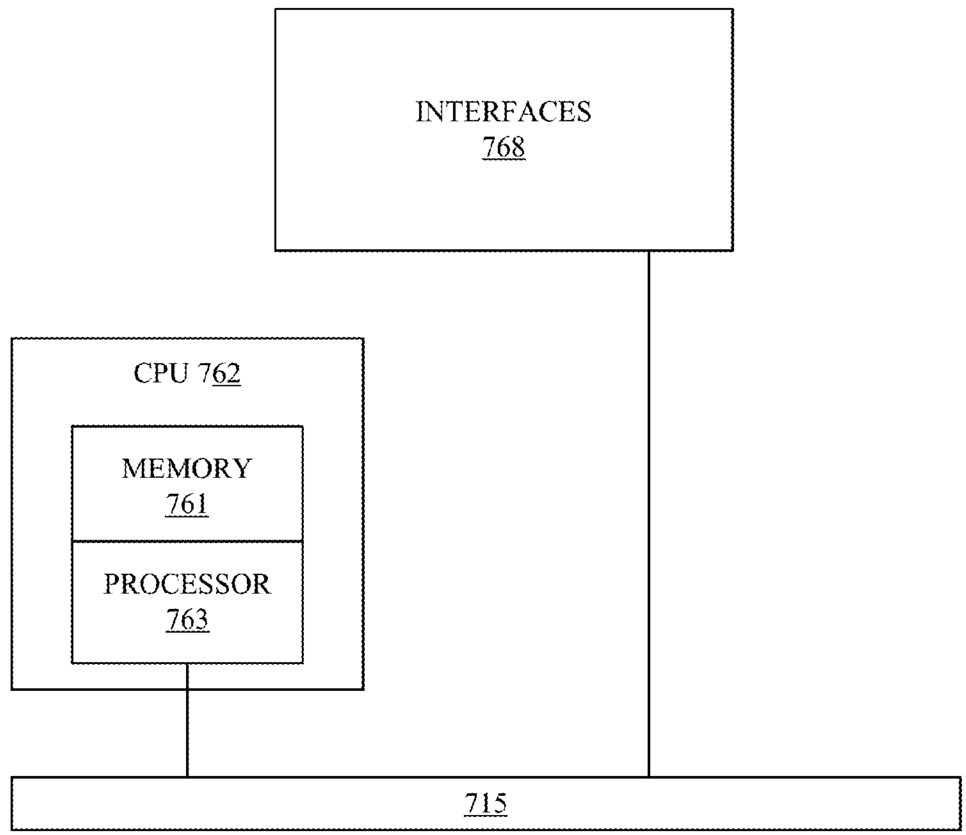
FIG. 7 illustrates an example network device.
Figure 8B:
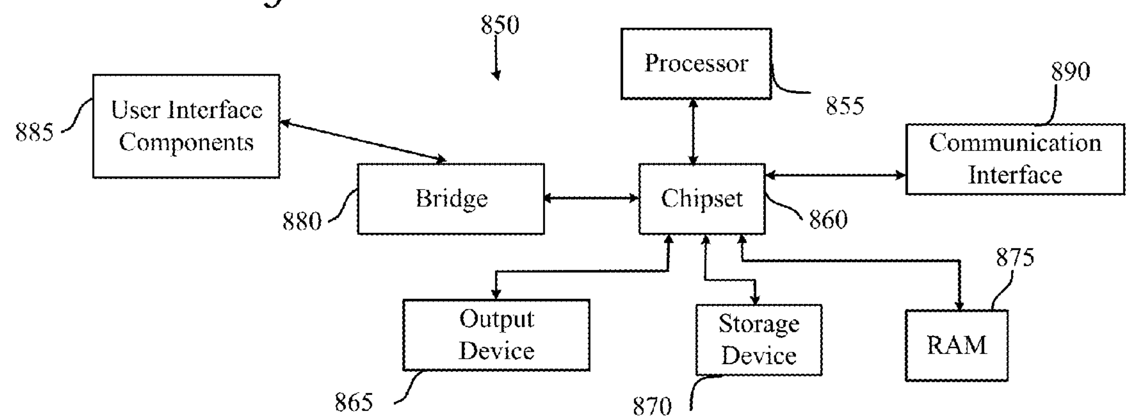
FIGS. 8A and 8B illustrate example system embodiments.
Figure 8A:
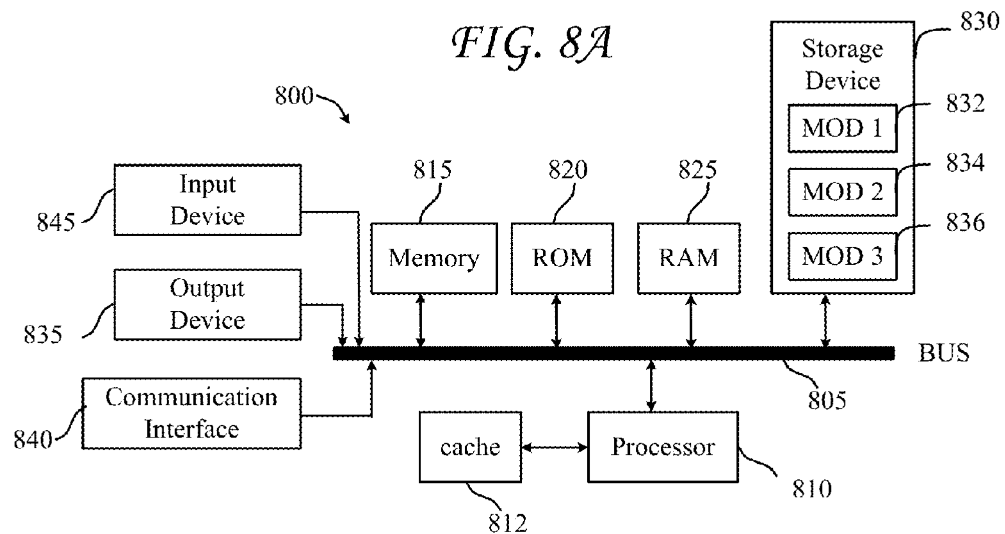

The disclosed technology addresses the need in the art for OAM in overlay networks. Disclosed are systems, methods, and computer-readable storage media for OAM in overlay networks. A description of overlay and underlay network computing environments, as illustrated in FIGS. 1-3, is first disclosed herein. A discussion of OAM in overlay networks, as illustrated in FIGS. 4-6, will then follow. The discussion then concludes with a description of example devices, as illustrated in FIGS. 7 and 8A-B. These variations shall be described herein as the various embodiments are set forth. The disclosure now turns to FIG. 1.

FIG. 1 illustrates a diagram of an example overlay network 100. Overlay network 100 uses an overlay protocol, such as VXLAN (virtual extensible LAN), NVGRE (Network Virtualization using Generic Routing Encapsulation), or STT (stateless transport tunneling), to encapsulate traffic in L2 and/or L3 packets which can cross overlay L3 boundaries in the network.

The overlay network 100 can include a network 102, which can represent the core, physical network and/or fabric. In some cases, network 102 can include an IP and/or MPLS network. Moreover, network 102 can be a service provider network. For example, network 102 can be an IP and/or MPLS service provider network.

Overlay network 100 can include devices 106A-D interconnected via network 102. Devices 106A-D can include virtual tunnel end points 108A-D, which can be physical or virtual nodes or switches configured to encapsulate and de-encapsulate data traffic according to a specific overlay protocol of the network 100, for the various virtual network identifiers (VNIDs) 110A-D. Devices 106A-D can include servers containing a VTEP functionality, hypervisors, and physical network devices, such as switches, configured with a virtual tunnel endpoint functionality. For example, devices 106A and 106B can be physical switches, such as top-of-rack (ToR) switches, configured to run VTEPs 108A-B. Here, devices 106A and 106B can be connected to servers 104A-D which, in some cases, can include virtual workloads through VMs loaded on the servers.

In some embodiments, network 100 can be a VXLAN network, and virtual tunnel end points 108A-D can be VXLAN tunnel end points (VTEPs). However, as one of ordinary skill in the art will readily recognize, overlay network 100 can represent any type of overlay or software-defined network, as previously mentioned.

The VNIDs can represent the segregated virtual networks in overlay network 100. Each of the overlay tunnels (VTEPs 108A-D) can be coupled with one or more VNIDs. For example, VTEP 108A can be coupled with virtual or physical devices or workloads residing in VNIDs 1 and 2; VTEP 108B can be coupled with virtual or physical devices or workloads residing in VNIDs 1 and 3; VTEP 108C can be coupled with virtual or physical devices or workloads residing in VNIDs 1 and 2; and VTEP 108D can be coupled with virtual or physical devices or workloads residing in VNIDs 1, 2, and 3. As one of ordinary skill in the art will readily recognize, any particular VTEP can, in other embodiments, be coupled with more or less VNIDs than the VNIDs illustrated in FIG. 1.

The traffic in overlay network 100 can be segregated logically according to specific VNIDs. This way, traffic intended for VNID 1 can be accessed by devices residing in VNID 1, while other devices residing in other VNIDs (e.g., VNIDs 2 and 3) can be prevented from accessing such traffic. In other words, devices or endpoints in specific VNIDs can communicate with other devices or endpoints in the same specific VNIDs, while traffic from separate VNIDs can be isolated to prevent devices or endpoints in other specific VNIDs from accessing traffic in different VNIDs.

Each of the servers 104A-D and VMs 104E-L can be associated with a respective VNID or virtual segment, and communicate with other servers or VMs residing in the same VNID or virtual segment. For example, server 104A can communicate with server 104C and VM 104E because they all reside in the same VNID, viz., VNID 1. Similarly, server 101B can communicate with VMs 104F, 104H, and 104L because they all reside in VNID 2.

Each of the servers 104A-D and VMs 104E-L can represent a single server or VM, but can also represent multiple servers or VMs, such as a cluster of servers or VMs. Moreover, VMs 104E-L can host virtual workloads, which can include application workloads, resources, and services, for example. On the other hand, servers 104A-D can host local workloads on a local storage and/or a remote storage, such as a remote database. However, in some cases, servers 104A-D can similarly host virtual workloads through VMs residing on the servers 104A-D.

VTEPs 108A-D can encapsulate packets directed at the various VNIDs 1-3 in the overlay network 100 according to the specific overlay protocol implemented, such as VXLAN, so traffic can be properly transmitted to the correct VNID and recipient(s) (i.e., server or VM). Moreover, when a switch, router, VTEP, or any other network device receives a packet to be transmitted to a recipient in the overlay network 100, it can consult a routing table or virtual routing and forwarding (VRF) table, such as a lookup table, to determine where such packet needs to be transmitted so the traffic reaches the appropriate recipient. For example, if VTEP 108A receives a packet from an endpoint that is intended for VM 104E, VTEP 108A can consult a routing table that maps the intended VM, VM 104E, to a specific network device (e.g., VTEP 108C) that is configured to handle communications intended for endpoint that VM (e.g., VM 104E). VTEP 108A might not initially know, when it receives the packet from the endpoint, that such packet should be transmitted to VTEP 108C in order to reach VM 104E. Thus, by consulting the routing table, VTEP 108A can lookup VM 104E, which is the intended recipient, and determine that the packet should be transmitted to VTEP 108C, as specified in the routing table based on endpoint-to-switch mappings or bindings, so the packet can be transmitted to, and received by, VM 104E as expected.

As one of ordinary skill in the art will readily recognize, the examples provided above are non-limiting examples provided for explanation purposes, and can include other variations of protocols, topologies, or devices.

FIG. 2 illustrates an example deployment 200 of overlay network 100. In some embodiments, the deployment 200 can be an Ethernet VPN (EVPN) control plane. Moreover, the fabric 212 can include an IP and/or MPLS network, for example. Further, the fabric 212 can represent the underlay (i.e., physical network) of the overlay network 100.

The fabric 212 can include spine routers 1-N ($\mathbf{202}_{A-N}$) (collectively "202) and leaf routers 1-N ($\mathbf{204}_{A-N}$) (collectively "204"). Leaf routers 204 can reside at the edge of the fabric 212, and can thus represent the physical network edge. In some cases, the leaf routers 204 can be top-of-rack ("ToR") switches configured according to a ToR architecture. In other cases, the leaf routers 204 can be aggregation switches in any particular topology, such as end-of-row (EoR) or middle-of-row (MoR) topologies. Moreover, the leaf routers 204 can be the provider edge (PE) devices in the fabric 212.

The leaf routers 204 can be responsible for routing and/or bridging the tenant packets and applying network policies. On the other hand, the spine routers 202 can perform the routing within the fabric 212. Thus, network connectivity in the fabric 212 can flow from the spine routers 202 through the leaf routers 204. The leaf routers 204 can provide servers 1-N ($\mathbf{208}_{A-N}$) (collectively "208") and VMs 1-2 (210A-210B) (collectively "210") access to the fabric 212. In some cases, the leaf routers 204 can also provide any other servers, resources, endpoints, external networks, VMs, services, tenants, or workloads with access to the fabric 212.

The leaf routers 204 can include VTEP interfaces 1-N ($\mathbf{216}_{A-N}$) (collectively "216"), and switching virtual interfaces (SVIs) 1-N ($\mathbf{214}_{A-N}$) (collectively "214"). The VTEP interfaces 216 can encapsulate and decapsulate packets to and from the overlay, such as overlay network 100, to the underlay (e.g., fabric 212) in order to connect devices in the overlay (e.g., servers 208 and VMs 210) through the underlay. The SVIs 214 can provide virtual interfaces used by the leaf routers 204 to communicate with the overlay (e.g., servers 208 and VMs 210). The SVIs 214 can receive overlay-encapsulated packets from the VTEPs 216 and forward the packets to one or more devices in the overlay.

In some embodiments, the spine router 2 ($\mathbf{202}_B$) can include a route reflector 206. The route reflector 206 can act as a central point for internal border gateway protocol (IBGP) sessions. The route reflector 206 can act as a route reflector server, allowing other routers to peer with the route reflector 206. EVPN BGP adjacencies can be established between the route reflector 206 and the leaf routers 204. A leaf router can pass its tenant system (TS) and VTEP information through BGP to the route reflector 206, which can then reflect the information to the other leaf routers.

The leaf routers 204 can have assigned addresses for their VTEP interfaces 216. The addresses assigned to the VTEP interfaces 216 can be underlay addresses, meaning, the addresses can be based on one or more subnets in the underlay (i.e., fabric 212). The underlay addresses allow the leaf routers 204 to communicate with other devices in the underlay through the VTEP interfaces 216. Moreover, the leaf routers 204 can have assigned virtual addresses for their SVIs 214. The virtual addresses assigned to the SVIs 214 can be overlay addresses, meaning, the addresses can be based on one or more subnets in the overlay (e.g., servers 208 and VMs 210).

For example, VTEP 1 ($\mathbf{216}_A$) can be assigned underlay address 1.1.1.1, VTEP 2 ($\mathbf{216}_B$) can be assigned underlay address 1.1.1.2, VTEP 3 ($\mathbf{216}_c$) can be assigned underlay address 1.1.1.3, and VTEP N ($\mathbf{216}_N$) can be assigned underlay address 1.1.1.4. On the other hand, SVI 1 ($\mathbf{214}_A$) can be assigned overlay address 10.1.1.254, SVI 2 ($\mathbf{214}_B$) can be assigned overlay address 20.1.1.254, SVI 3 ($\mathbf{214}_c$) can be assigned overlay address 10.1.1.254, and SVI N ($\mathbf{214}_N$) can be assigned overlay address 20.1.1.254. As illustrated, SVIs 214 can be assigned an anycast address as the overlay address, meaning, the SVIs 214 can be assigned address that are also assigned to one or more other SVIs. To illustrate, SVIs 1 and 3 ($\mathbf{214}_A$ and $\mathbf{214}_c$) can both be assigned address 10.1.1.254, while SVIs 2 and N ($\mathbf{214}_B$ and $\mathbf{214}_N$) can both be assigned address 20.1.1.254.

VMs 210 can be virtual machines hosted on servers 1 and 2 ($\mathbf{208}_A$ and $\mathbf{208}_B$), and may connect to the fabric 212 (i.e., the underlay) through leaf routers 1 and 2 ($\mathbf{204}_A$ and $\mathbf{204}_B$), respectively. For example, packets between the fabric and VMs 210 can flow through VTEPs 1 and 2 ($\mathbf{216}_A$ and $\mathbf{216}_B$) and SVIs 1 and 2 ($\mathbf{214}_A$ and $\mathbf{214}_B$). Here, VMs 210 can connect to SVIs 1 and 2 ($\mathbf{214}_A$ and $\mathbf{214}_B$) on the overlay side. VTEPs 1 and 2 ($\mathbf{216}_A$ and $\mathbf{216}_B$) can encapsulate and decapsulate packets for communication through the fabric 212 (i.e., the underlay).

Because one or more SVIs can have an anycast address, certain OAM tools, such as ICMP traceroute, may not function properly in the deployment 200. For example, since the anycast address of one or more SVIs is shared between multiple leaf routers, a recipient of an ICMP message would not be able to tell from which leaf router the ICMP message specifically came from based on the source IP address. To illustrate, if VM 1 ($\mathbf{210}_A$) does a traceroute to VM 2 ($\mathbf{210}_B$), it would receive an ICMP message with the address 10.1.1.254 for the first hop, and an ICMP message with the address 20.1.1.254 for the second hop. From the received ICMP messages, VM 1 ($\mathbf{210}_A$) may not be able to tell if the first hop to VM 2 ($\mathbf{210}_B$) is leaf router 1 ($\mathbf{204}_A$) or leaf router 3 ($\mathbf{204}_c$), as the SVIs associated with leaf router 1 ($\mathbf{204}_A$) or leaf router 3 ($\mathbf{204}_c$) have the same anycast address (10.1.1.254). Similarly, VM 1 ($\mathbf{210}_A$) may not be able to tell if the second hop to VM 2 ($\mathbf{210}_B$) is leaf router 2 ($\mathbf{204}_B$) or leaf router N ($\mathbf{204}_N$), as the SVIs associated with leaf router 2 ($\mathbf{204}_B$) or leaf router N ($\mathbf{204}_N$) also have the same anycast address (20.1.1.254).

Accordingly, in some embodiments, leaf routers 204 can modify OAM messages, such as ICMP messages, prior to sending the OAM messages to the VMs 210 (or any other device in the overlay), to identify the source address of the OAM messages they send to the VMs 210 (i.e., their own address provided in the OAM messages) to identify the address assigned to the VTEPs 216 (i.e., the underlay address) as opposed to the address assigned to the SVIs 214 (i.e., the overlay or anycast address).

For example, leaf router 1 ($\mathbf{204}_A$) can receive a traceroute message from VM 1 ($\mathbf{210}_A$) with the address 20.1.1.2 assigned to VM 2 ($\mathbf{210}_B$) set as the destination address, and respond with an ICMP message that identifies 1.1.1.1 (its VTEP address) as the address of leaf router 1 ($\mathbf{204}_A$) (i.e., the source address of the ICMP message), as opposed to 10.1.1.254 which is the overlay address of the leaf router 1 (204$_A$). Thus, VM 1 (210$_A$) can receive the ICMP message from leaf router 1 (204$_A$) and determine that the first hop to address 20.1.1.2 assigned to VM 2 (210$_B$) is leaf router 1 (204$_A$).

Similarly, leaf router 2 (204$_B$) can receive a similar traceroute message from VM 1 (210$_A$) with the address 20.1.1.2 assigned to VM 2 (210$_B$) set as the destination address, and respond with an ICMP message that identifies 1.1.1.2 (its VTEP address) as the address of leaf router 2 (204$_B$), as opposed to 20.1.1.254 which is the overlay address of the leaf router 2 (204$_B$). Thus, VM 1 (210$_A$) can receive the ICMP message from leaf router 2 (204$_B$) and determine that the second hop to address 20.1.1.2 assigned to VM 2 (210$_B$) is leaf router 2 (204$_B$). This process can continue as necessary until the traceroute message from VM 1 (210$_A$) reaches the leaf router attached to the destination address 20.1.1.2 assigned to VM 2 (210$_B$). Accordingly, VM 1 (210$_A$) is able to determine the precise identity of the leaf routers at each hop to the destination.

FIG. 3 illustrates a diagram of an example OAM message operation 300. The OAM message operation 300 can be any OAM message operation, such as ICMP traceroute or ping. However, as a non-limiting example for explanation purposes, the OAM message operation is discussed below as a ICMP traceroute operation based on the deployment 200 shown in FIG. 2.

The ICMP traceroute operation originates at VM 1 (210$_A$), which first transmits a message 308 to the destination address 20.1.1.2 assigned to VM 2 (210$_B$). The message includes one or more packets, such a UDP packet or a series of UDP packets for each of the hops 302-306 to the destination address 20.1.1.2. For example, in some cases, the VM 1 (210$_A$) can transmit a packet to the first hop 302 (leaf router 1 (204$_A$)) with a TTL of 1 and a packet to the second hop 304 (leaf router 2 (204$_B$)) with a TTL of 2.

The leaf router 1 (204$_A$) can receive the message 308 (i.e., packet). The leaf router 1 (204$_A$) can decrease the TTL value by 1 to 0. When the packet in the message 308 reaches a TTL of 0, the packet cannot be forwarded so the leaf router 1 (204$_A$) can generate an ICMP error message 310 to VM 1 (210$_A$). The leaf router 1 (204$_A$) can then modify the ICMP error message 310 to change the source address in the ICMP error message 310, which corresponds to the leaf router 1 (204$_A$), from source address 10.1.1.254, which corresponds to the overlay address (i.e., SVI address) of leaf router 1 (204$_A$), to source address 1.1.1.1, which corresponds to the underlay address (i.e., VTEP address) of leaf router 1 (204$_A$). The ICMP TTL exceeded in transit error message can identify the source address of the ICMP error message as address 1.1.1.1 instead of address 10.1.1.254, as previously explained.

Upon receiving the error message 310, VM 1 (210$_A$) can send another UDP packet 312 destined to VM 2 (210$_B$). The packet 312 can have a TTL of 2. Once the leaf router 2 (204$_B$) receives the packet 312, it can decrement the TTL to zero. When the TTL value reaches zero, the packet 312 cannot be forwarded. Thus, the leaf router 2 (204$_B$) generates an ICMP error message 314 to VM 1 (210$_A$). The leaf router 2 (204$_B$) can modify the ICMP error message 314 to change the source address in the ICMP error message 314, which corresponds to the leaf router 2 (204$_B$), from source address 20.1.1.254, which corresponds to the overlay address (i.e., SVI address) of leaf router 2 (204$_B$), to source address 1.1.1.2, which corresponds to the underlay address (i.e., VTEP address) of leaf router 2 (204$_B$).

Upon receiving the ICMP error message 314, VM 1 (210$_A$), VM 1 (210$_A$) can send another UDP packet 316 destined to VM 2 (210$_B$). The packet 316 can have a TTL of 3. Leaf router 1 (204$_A$) can decrement the TTL to 2 and forward the packet 316 to leaf router 2 (204$_B$). Leaf router 2 (204$_B$) can decrement the TTL to 1 and also forward the packet. VM 2 (210$_B$) can receive the packet 316 and generate and send an ICMP error message 318 of destination port unreachable back to VM 1 (210$_A$), as the destination UDP port used is not valid in VM 2 (210$_B$).

As illustrated above, VM 1 (210$_A$) can receive the ICMP error messages 310 and 314 and use the ICMP error messages 310 and 314 to determine the identity of each device (e.g., leaf router 1 (204$_A$) and leaf router 2 (204$_B$)) at each of the hops 302-306 in the path to the destination address 20.1.1.2, even if one or more devices in a given hop has an anycast address shared by other devices assigned as its overlay address. For example, VM 1 (210$_A$) can determine that the first hop 302 is address 1.1.1.1 corresponding to leaf router 1 (204$_A$) and the second hop 304 is address 1.1.1.2 corresponding to leaf router 2 (204$_B$).

Having disclosed some basic system components and concepts, the disclosure now turns to the exemplary method embodiments shown in FIGS. 4 and 5. For the sake of clarity, the methods are described in terms of a leaf router 1 (204$_A$), as shown in FIG. 2, configured to practice the methods. The steps outlined herein are exemplary and can be implemented in any combination thereof, including combinations that exclude, add, or modify certain steps.

At step 400, the leaf router 1 (204$_A$) can generate an OAM packet in response to receiving a packet associated with an OAM operation from a device in the overlay network. The leaf router 1 (204$_A$) can include a tunnel endpoint interface, such as VTEP 1 (216$_A$), which can have an underlay address assigned to it. The leaf router 1 (204$_A$) can also have a virtual interface, such as SVI 1 (214$_A$), which can have an overlay address assigned to it. The overlay address can be an anycast address that is assigned to the leaf router 1 (204$_A$) and one or more interfaces or devices in the overlay network, as illustrated in FIG. 2. For example, the anycast address can be an overlay address that is assigned to both SVI 1 (214$_A$) associated with leaf router 1 (204$_A$) and SVI 2 (214$_B$) associated with leaf router 2 (204$_B$). The tunnel endpoint in leaf router 1 (204$_A$) can encapsulate and decapsulate packets from/to an overlay network to allow communications between the underlay network (i.e., the physical network), such as fabric 212 shown in FIG. 2, and the overlay devices, such as servers 208 and VMs 210 shown in FIG. 2.

The packet associated with the OAM operation can be a packet for initiating, establishing, or triggering the OAM operation. For example, the packet can be a UDP packet configured to trigger an ICMP message reply from the leaf router 1 (204$_A$) and/or any other node along the path of the packet to the destination. The OAM operation can be, for example, a traceroute or ping operation, an ICMP operation, or any other OAM operation. Moreover, the OAM packet can be any OAM packet, such as an ICMP packet, for example. The OAM packet can include a destination address of the OAM packet, which can correspond to the source address of the packet received by the leaf router 1 (204$_A$). For example, if the packet is received by the leaf router 1 (204$_A$) from VM 1 (210$_A$), then VM 1 (210$_A$), which is the source of the packet, can be set as the destination of the OAM packet. The OAM packet can also include a source address of the OAM packet. The source address of the OAM packet can be an address of leaf router 1 (204$_A$). For example, if the packet is received from VM 1 (210$_A$), the source address of the OAM packet can be set to the address of SVI 1 (214$_A$) associated with the leaf router 1 (204$_A$), as the SVI 1 (214$_A$) is the interface in the overlay network that would receive the packet from VM 1 (210$_A$).

Next, at step 402, the leaf router 1 (204$_A$) can determine that a destination address associated with the packet is not reachable by the leaf router 1 (204$_A$) through the virtual interface. Moreover, at step 404, the leaf router 1 (204$_A$) can also determine that the destination address is reachable by the leaf router 1 (204$_A$) through the tunnel endpoint interface. In other words, the leaf router 1 (204$_A$) can determine that it is an ingress switch in the path between the device which sent the packet and a destination node in the overlay network corresponding to the destination address in the packet. For example, the leaf router 1 (204$_A$) can determine that the destination address of the packet (i.e., the intended target) is not reachable by the leaf router 1 (204$_A$) through the SVI 1 (214$_A$) but otherwise reachable by the leaf router 1 (204$_A$) through the VTEP 1 (216$_A$). To illustrate, referring to FIG. 2, if the packet is received by the leaf router 1 (204$_A$) from VM 1 (210$_A$) with the destination address of 20.1.1.2 corresponding to VM 2 (210$_B$), then the leaf router 1 (204$_A$) can determine that the destination address of 20.1.1.2 is not reachable by the SVI 1 (214$_A$) as SVI 1 (214$_A$) is in the 10.1.1.0/24 subnet, but otherwise reachable through the VTEP 1 (216$_A$) as the VTEP 1 (216$_A$) can reach the destination address 20.1.1.2 through the fabric 212 (i.e., the underlay).

At step 406, the leaf router 1 (204$_A$) can provide the underlay address associated with the tunnel endpoint interface of the leaf router 1 (204$_A$) as a source address in the OAM packet. For example, the leaf router 1 (204$_A$) can modify the source address provided in the OAM packet when the OAM packet is originally created to identify the underlay address (e.g., VTEP 1) instead of the overlay address (e.g., SVI 1). Typically, in the context of an overlay network, when the OAM packet is created by a tunnel endpoint interface, the source address provided in the OAM packet is the overlay address of the virtual interface which sends the OAM packet to the device which sent the packet that triggered the OAM operations. However, since the overlay address can be an anycast address shared by multiple devices, it may be difficult or impossible to distinguish which specific device is associated with the OAM packet when the source address identified in the OAM packet is the anycast address shared by the multiple devices. Thus, by modifying the OAM packet to identify the underlay address, which is typically a unique address in the underlay network, the OAM packet can clearly indicate which specific device is associated with the OAM packet even if such device has a virtual interface with an anycast address shared by other devices on the overlay network. In other words, the OAM packet can uniquely identify the device—and consequently the hop—that handled or created the OAM packet.

In some cases, the virtual interface of the leaf router 1 (204$_A$) can be connected to an overlay network, such as VXLAN, having an EVPN control plane. Moreover, the leaf router 1 (204$_A$) can modify the OAM packet through a module between the TCP/IP stack and the tunnel endpoint interface after the OAM packet is generated by the TCP/IP stack. In some cases, the module can modify the OAM packet before the OAM packet is encapsulated by the tunnel endpoint interface into an overlay packet. For example, the module can intercept the OAM packet as it passes from the virtual interface (e.g., SVI 1) of the leaf router 1 (204$_A$) to the tunnel endpoint (e.g., VTEP 1) of the leaf router 1 (204$_A$). In some cases, the module can monitor OAM packets or messages created by the TCP/IP stack for possible modification. Further, when modifying the packet, the module can provide the underlay address and/or the original packet received by the leaf router 1 (204$_A$) as a payload of the overlay packet.

Referring to FIG. 5, at step 500, the leaf router 2 (204$_B$) generates an OAM packet in response to receiving a packet associated with an OAM operation. The leaf router 2 (204$_B$) can include a tunnel endpoint address, which can have an underlay address, and a virtual interface, which can have an overlay address that is assigned to other devices or nodes as well (i.e., anycast address).

At step 502, the leaf router 2 (204$_B$) determines that the destination address associated with the packet is reachable by the leaf router 2 (204$_B$) through the virtual interface. The destination address can correspond to a destination node in the overlay network, such as VM 2 (210$_B$). At step 504, the leaf router 2 (204$_B$) determines that the source overlay address in the packet associated with the OAM operation (i.e., the destination address of the OAM packet, which can also be the originating address of the packet received by the leaf router 2 (204$_B$)) is reachable by the leaf router 2 (204$_B$) through the tunnel endpoint interface.

At step 506, the leaf router 2 (204$_B$) provides the underlay address associated with the tunnel endpoint interface of the leaf router 2 (204$_B$) as a modified source address in the OAM packet. Here, the leaf router 2 (204$_B$) can modify the OAM packet to change the source address in the OAM packet from the overlay address associated with the virtual interface to the underlay address associated with the tunnel endpoint interface.

FIG. 6 illustrates a flowchart of an example method 600 for determining whether to modify an OAM packet. At step 602, the leaf router 1 (204$_A$) determines if the destination address associated with the packet is reachable by the leaf router 1 (204$_A$) through the virtual interface. If the destination address is reachable by the leaf router 1 (204$_A$) through the virtual interface, at step 604, the leaf router 1 (204$_A$) determines if the source overlay address in the packet associated with the OAM operation is reachable by the leaf router 1 (204$_A$) through the tunnel endpoint interface. If the overlay address is not reachable through the tunnel endpoint interface, the leaf router 1 (204$_A$) can forward the OAM packet without modifying the source address in the OAM packet. On the other hand, if the overlay address is reachable through the tunnel endpoint interface, at step 608 the leaf router 1 (204$_A$) can modify the source address in the OAM packet to identify the underlay address of the leaf router 1 (204$_A$) (i.e., the tunnel endpoint interface address) instead of the overlay address of the leaf router 1 (204$_A$) (i.e., the virtual interface).

If the destination address is not reachable by the leaf router 1 (204$_A$) through the virtual interface, at step 606 the leaf router 1 (204$_A$) can determine if the destination address is reachable by the leaf router 1 (204$_A$) through the tunnel endpoint interface. If the destination address is not reachable by the leaf router 1 (204$_A$) through the tunnel endpoint interface, the leaf router 1 (204$_A$) can forward the OAM packet without modifying the source address in the OAM packet. On the other hand, if the destination address is reachable by the leaf router 1 (204$_A$) through the tunnel endpoint interface, at step 608 the leaf router 1 (204$_A$) can modify the source address in the OAM packet to identify the underlay address of the leaf router 1 (204$_A$) (i.e., the tunnel endpoint interface address) instead of the overlay address of the leaf router 1 (204$_A$) (i.e., the virtual interface).

While the method 600 is described herein as being performed by leaf router 1 (204$_A$), one of ordinary skill in the art will recognize that the method 600 can be performed by any of the leaf routers 204, such as leaf router 2 (204$_B$), or any other network device in an overlay network. However, the method 600 is described herein with reference to leaf router 1 (204$_A$) in FIG. 2 as a non-limiting example for explanation purposes.

Moreover, in some embodiments, the method 600, including steps 602-608, can be performed by a module in the network device, such as a module in leaf router 1 (204$_A$). For example, a module in leaf router 1 (204$_A$) can modify the OAM packet as it passes from the virtual interface (i.e., SVI 1 (214$_A$)) of the leaf router 1 (204$_A$) to the tunnel endpoint interface (i.e., VTEP 1 (216$_A$)) of the leaf router 1 (204$_A$). In some cases, the module can modify the OAM packet after it is generated by the TCP/IP stack of the device and before it is encapsulated by the VTEP 1 (216A) of leaf router 1 (204$_A$).

Example Devices

FIG. 7 illustrates an example network device 710 suitable for high availability and failover. Network device 710 includes a master central processing unit (CPU) 762, interfaces 768, and a bus 715 (e.g., a PCI bus). When acting under the control of appropriate software or firmware, the CPU 762 is responsible for executing packet management, error detection, and/or routing functions. The CPU 762 preferably accomplishes all these functions under the control of software including an operating system and any appropriate applications software. CPU 762 may include one or more processors 763 such as a processor from the Motorola family of microprocessors or the MIPS family of microprocessors. In an alternative embodiment, processor 763 is specially designed hardware for controlling the operations of router 710. In a specific embodiment, a memory 761 (such as non-volatile RAM and/or ROM) also forms part of CPU 762. However, there are many different ways in which memory could be coupled to the system.

The interfaces 768 are typically provided as interface cards (sometimes referred to as "line cards"). Generally, they control the sending and receiving of data packets over the network and sometimes support other peripherals used with the router 710. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 762 to efficiently perform routing computations, network diagnostics, security functions, etc.

Although the system shown in FIG. 7 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 761) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

FIG. 8A and FIG. 8B illustrate example system embodiments. The more appropriate embodiment will be apparent to those of ordinary skill in the art when practicing the present technology. Persons of ordinary skill in the art will also readily appreciate that other system embodiments are possible.

FIG. 8A illustrates a conventional system bus computing system architecture 800 wherein the components of the system are in electrical communication with each other using a bus 805. Exemplary system 800 includes a processing unit (CPU or processor) 810 and a system bus 805 that couples various system components including the system memory 815, such as read only memory (ROM) 820 and random access memory (RAM) 825, to the processor 810. The system 800 can include a cache of high-speed memory connected directly with, in close proximity to, or integrated as part of the processor 810. The system 800 can copy data from the memory 815 and/or the storage device 830 to the cache 812 for quick access by the processor 810. In this way, the cache can provide a performance boost that avoids processor 810 delays while waiting for data. These and other modules can control or be configured to control the processor 810 to perform various actions. Other system memory 815 may be available for use as well. The memory 815 can include multiple different types of memory with different performance characteristics. The processor 810 can include any general purpose processor and a hardware module or software module, such as module 1 832, module 2 834, and module 3 836 stored in storage device 830, configured to control the processor 810 as well as a special-purpose processor where software instructions are incorporated into the actual processor design. The processor 810 may essentially be a completely self-contained computing system, containing multiple cores or processors, a bus, memory controller, cache, etc. A multi-core processor may be symmetric or asymmetric.

To enable user interaction with the computing device 800, an input device 845 can represent any number of input mechanisms, such as a microphone for speech, a touch-sensitive screen for gesture or graphical input, keyboard, mouse, motion input, speech and so forth. An output device 835 can also be one or more of a number of output mechanisms known to those of skill in the art. In some instances, multimodal systems can enable a user to provide multiple types of input to communicate with the computing device 800. The communications interface 840 can generally govern and manage the user input and system output. There is no restriction on operating on any particular hardware arrangement and therefore the basic features here may easily be substituted for improved hardware or firmware arrangements as they are developed.

Storage device 830 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 825, read only memory (ROM) 820, and hybrids thereof.

The storage device 830 can include software modules 832, 834, 836 for controlling the processor 810. Other hardware or software modules are contemplated. The storage device 830 can be connected to the system bus 805. In one aspect, a hardware module that performs a particular function can include the software component stored in a computer-readable medium in connection with the necessary hardware components, such as the processor 810, bus 805, display 835, and so forth, to carry out the function.

FIG. 8B illustrates an example computer system 850 having a chipset architecture that can be used in executing the described method and generating and displaying a graphical user interface (GUI). Computer system 850 is an example of computer hardware, software, and firmware that can be used to implement the disclosed technology. System 850 can include a processor 855, representative of any number of physically and/or logically distinct resources capable of executing software, firmware, and hardware configured to perform identified computations. Processor 855 can communicate with a chipset 860 that can control input to and output from processor 855. In this example, chipset 860 outputs information to output device 865, such as a display, and can read and write information to storage device 870, which can include magnetic media, and solid state media, for example. Chipset 860 can also read data from and write data to RAM 875. A bridge 880 for interfacing with a variety of user interface components 885 can be provided for interfacing with chipset 860. Such user interface components 885 can include a keyboard, a microphone, touch detection and processing circuitry, a pointing device, such as a mouse, and so on. In general, inputs to system 850 can come from any of a variety of sources, machine generated and/or human generated.

Chipset 860 can also interface with one or more communication interfaces 890 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 855 analyzing data stored in storage 870 or 875. Further, the machine can receive inputs from a user via user interface components 885 and execute appropriate functions, such as browsing functions by interpreting these inputs using processor 855.

It can be appreciated that example systems 800 and 850 can have more than one processor 810 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

We claim:

1. A method comprising:

in response to receiving, by a first device coupled with an overlay network from a second device in the overlay network, a packet associated with an operations, administration and management (OAM) operation, generating an OAM packet at the first device, the first device comprising a tunnel endpoint interface associated with an underlay address and a virtual interface associated with an overlay address, the overlay address comprising an anycast address that is assigned to the first device and at least one other device in the overlay network, wherein the OAM packet is generated by a TCP/IP stack and encapsulated by the tunnel endpoint interface;

determining, by the first device, that a destination address associated with the packet is not reachable by the first device through the virtual interface, the destination address corresponding to a destination node in the overlay network;

determining, by the first device, that the destination address is reachable by the first device through the tunnel endpoint interface; and providing, by the first device, the underlay address associated with the tunnel endpoint interface of the first device as a source address in the OAM packet, and modifying the OAM packet generated by the TCP/IP stack to identify the underlay address associated with the tunnel endpoint interface as the source address in the OAM packet.

2. The method of claim 1, further comprising: sending the OAM packet to the second device, the OAM packet identifying the underlay address as the source address.

3. The method of claim 1, wherein the packet comprises a user datagram protocol (UDP) packet and the OAM packet comprises an internet control message protocol (ICMP) packet.

4. The method of claim 3, wherein the packet contains a time-to-live (TTL) value of 1, and wherein the ICMP packet comprises a time-to-live exceed in transit error message, and wherein the OAM operation comprises a traceroute operation.

5. The method of claim 1, wherein the first device is further coupled with an underlay network, and wherein the overlay network comprises a virtual extensible local area network (VXLAN) with an Ethernet virtual private network (EVPN) control plane.

6. The method of claim 1, further comprising:

in response to receiving, by a third device coupled with the overlay network from the second device, a second packet associated with the OAM operation, generating a second OAM packet, the third device comprising a second tunnel endpoint interface associated with a second underlay address and a second virtual interface associated with a second overlay address, the second overlay address comprising a second anycast address that is assigned to the third device and at least one other device in the overlay network;

determining, by the third device, that a destination address in the second packet is reachable by the third device through the second virtual interface, the destination address in the second packet corresponding to the destination node in the overlay network;

determining, by the third device, that a source address of the second packet is reachable by the third device through the second tunnel endpoint interface; and providing, by the third device, the second underlay address associated with the second tunnel endpoint interface of the third device as a source address in the second OAM packet.

7. The method of claim 6, wherein the second anycast address assigned to the third device is equivalent to the anycast address assigned to the first device.

8. The method of claim 6, wherein the second anycast address assigned to the third device is different than the anycast address assigned to the first device.

9. The method of claim 1, wherein the OAM packet is modified by a module between the TCP/IP stack and the tunnel endpoint interface after the OAM packet is generated by the TCP/IP stack and before the OAM packet is encapsulated by the tunnel endpoint interface into an overlay packet as a payload of the overlay packet.

10. The method of claim 9, further comprising:

receiving the OAM packet at the module after the OAM packet is generated by the TCP/IP stack; and modifying the OAM packet by changing the source address in the OAM packet from the overlay address associated with the tunnel endpoint interface to the underlay address.

11. A system comprising:

one or more processors; and a network interface coupled to the one or more processors; and a non-transitory computer-readable storage medium having stored therein instructions which, when executed by the one or more processors, cause the processors to perform operations comprising:

in response to receiving, from a device in an overlay network, a packet associated with an operations, administration and management (OAM) operation, generating an OAM packet at the system, the system comprising a tunnel endpoint interface associated with an underlay address and a virtual interface associated with an overlay address, the overlay address comprising an anycast address that is assigned to the system and at least one other device in the overlay network, wherein the OAM packet is generated by a TCP/IP stack and encapsulated by the tunnel endpoint interface;

determining that a destination address associated with the packet is reachable by the system through the virtual interface, the destination address corresponding to a destination node in the overlay network;

determining that a source overlay address in the packet associated with the OAM operation is reachable by the system through the tunnel endpoint interface, the overlay source address corresponding to the device in the overlay network; and providing the underlay address associated with the tunnel endpoint interface of the system as a modified source address in the OAM packet, and modifying the OAM packet generated by the TCP/IP stack to identify the underlay address associated with the tunnel endpoint interface as the source address in the OAM packet.

12. The system of claim 11, the non-transitory computer-readable storage medium storing additional instructions which, when executed by the processors, cause the processors to perform an operation comprising:

sending the OAM packet to the device, the OAM packet identifying the underlay address as the modified source address.

13. The system of claim 11, wherein the modified source address identifies a first hop in a path from the device to the destination node in the overlay network.

14. A non-transitory computer-readable storage medium having stored therein instructions which, when executed by a processor, cause the processor to perform operations comprising:

sending, by a first device in an overlay network to a second device, a packet associated with an operations, administration and management (OAM) operation, wherein the packet comprises a source address corresponding to an overlay address of the first device and a destination address corresponding to a third device in the overlay network, the second device comprising a tunnel endpoint interface associated with an underlay address and a virtual interface associated with an overlay address, the overlay address comprising an anycast address that is assigned to the second device and at least one other device in the overlay network, wherein the packet is generated by a TCP/IP stack and encapsulated by the tunnel endpoint interface;

in response to sending the packet, receiving, by the first device, a modified OAM packet from the second device, wherein the modified OAM packet has been modified to identify the underlay address associated with the tunnel endpoint interface as a new source address of the OAM packet; and based on the modified OAM packet, identifying the underlay address as a first hop in a path from the first device to the third device.

15. The non-transitory computer-readable storage medium of claim 14, the non-transitory computer-readable storage medium storing additional instructions which, when executed by the processor, cause the processor to perform an operation comprising presenting the underlay address as the first hop in the path from the first device to the third device.

16. The non-transitory computer-readable storage medium of claim 14, the non-transitory computer-readable storage medium storing additional instructions which, when executed by the processor, cause the processor to perform operations comprising:

sending, by the first device to a fourth device, a second packet associated with the OAM operation, wherein the second packet comprises the source address corresponding to the overlay address of the first device and the destination address corresponding to the third device in the overlay network, the fourth device comprising a second tunnel endpoint interface associated with a second underlay address and a second virtual interface associated with a second overlay address, the second overlay address comprising a second anycast address that is assigned to the fourth device and at least one other device in the overlay network;

in response to sending the second packet, receiving, by the first device, a second modified OAM packet from the fourth device, wherein the second modified OAM packet has been modified to identify the second underlay address associated with the second tunnel endpoint interface as a new source address of the second modified OAM packet; and based on the second modified OAM packet, identifying the second underlay address as a second hop in the path from the first device to the third device.

17. The non-transitory computer-readable storage medium of claim 16, the non-transitory computer-readable storage medium storing additional instructions which, when executed by the processor, cause the processor to perform an operation comprising presenting the second underlay address as the second hop in the path from the first device to the third device.

* * * * *